Sept. 29, 1959  H. E. WACKER  2,906,097
COOLING SYSTEM FOR MULTI-ENGINE POWER PLANT
Filed July 26, 1954  4 Sheets-Sheet 1
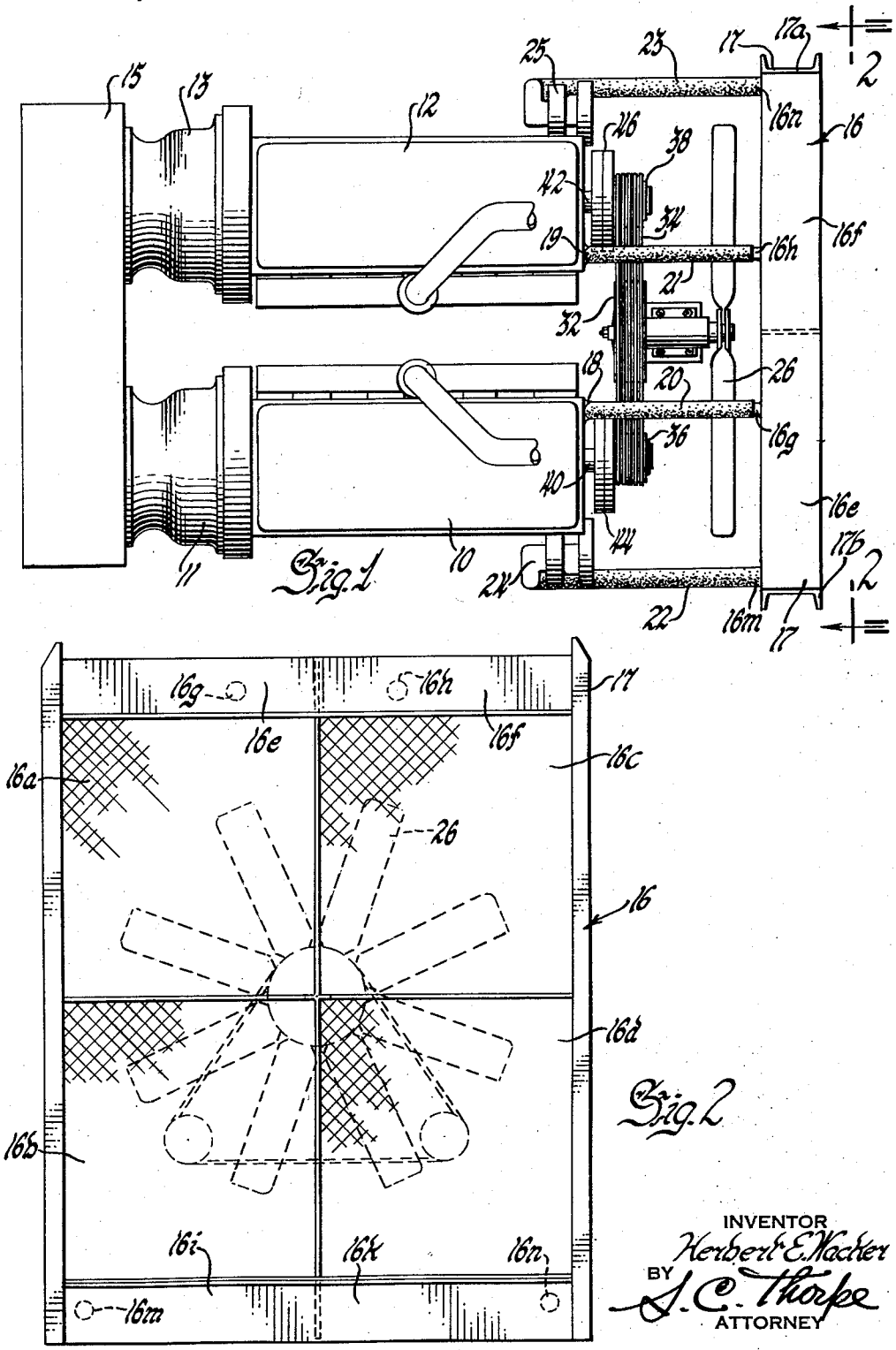

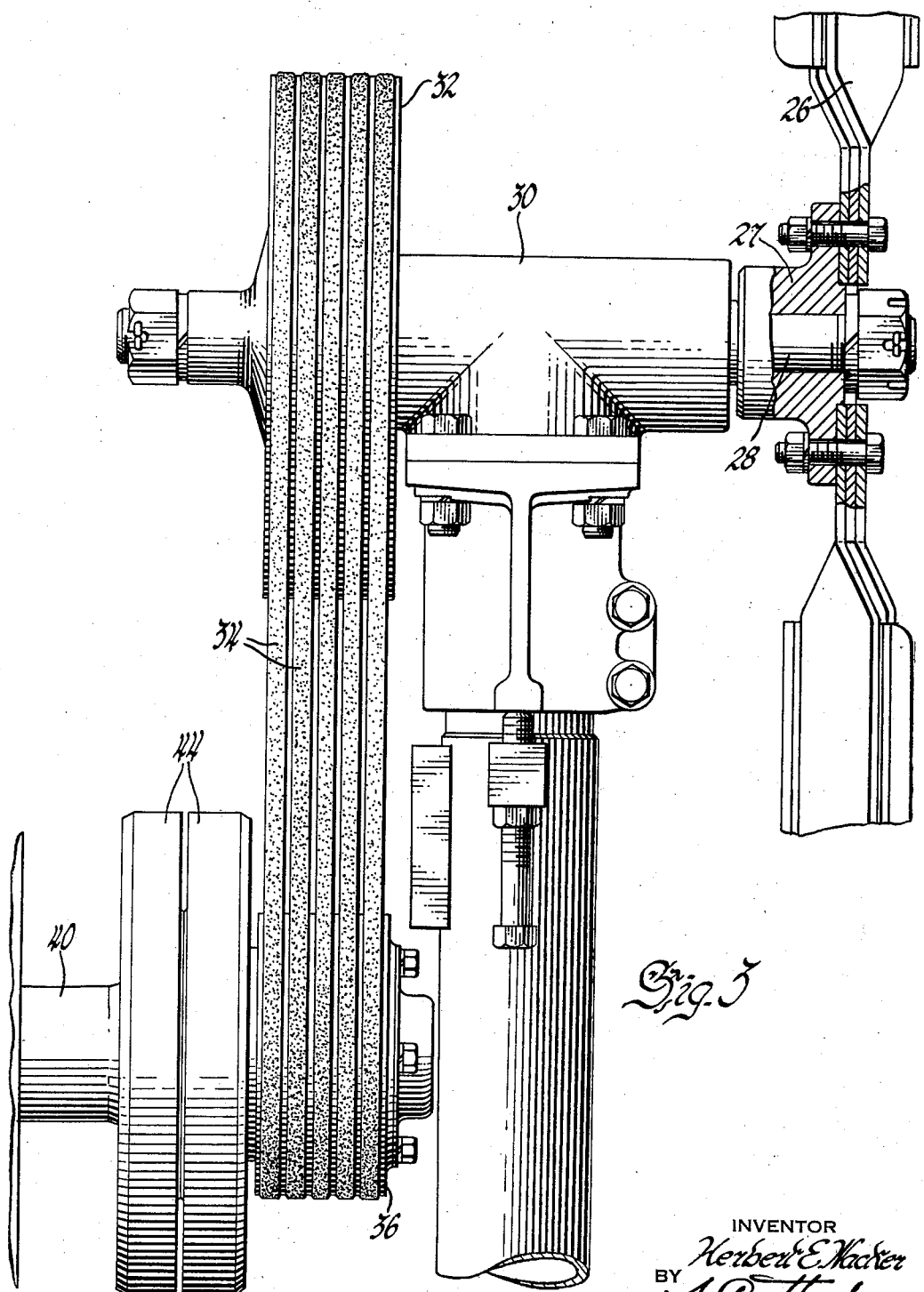

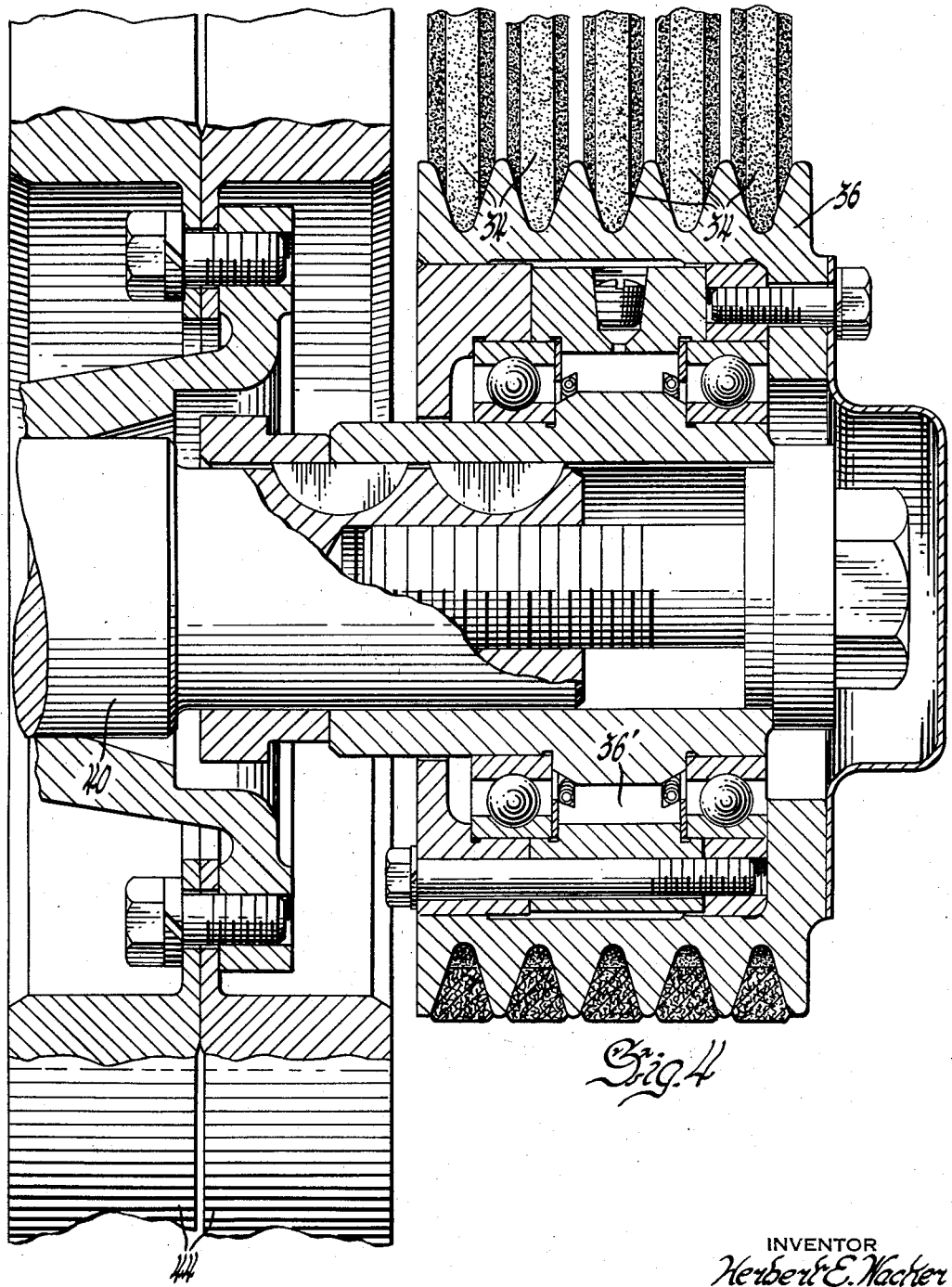

Sept. 29, 1959   H. E. WACKER   2,906,097
COOLING SYSTEM FOR MULTI-ENGINE POWER PLANT
Filed July 26, 1954   4 Sheets-Sheet 4

INVENTOR
Herbert E. Wacker
BY
J. C. Thorpe
ATTORNEY

United States Patent Office

2,906,097
COOLING SYSTEM FOR MULTI-ENGINE POWER PLANT

Herbert E. Wacker, Detroit, Mich., assignor to General Motors Corporation, Detroit, Mich., a corporation of Delaware Application July 26, 1954, Serial No. 445,557

6 Claims. (Cl. 60—97)

This invention relates generally to internal combustion engine cooling systems and particularly to a cooling fan drive and radiator arrangement for a multi-engine power plant installation.

In conventional multi-engine power plant installations, such as a twin engine unit, the number of engines operating at a given time is dependent upon the load requirements placed on the power plant as a whole. Since only one engine may be running at a time, it is customary to provide each engine with a separate radiator and a separate engine driven cooling fan therefor. These radiators are preferably of substantially square frontal area to take optimum advantage of the cooling fan. Inasmuch as the individual engines for such multi-engine power plant units are generally of rather large capacity, the necessary radiator surface required for each engine is relatively large. This necessitates the use of radiator cores of a size which are not serviceable in standard radiator repair shops so that when the radiator of one engine is damaged, it is generally necessary to return the radiator to the manufacturer for effecting the necessary repair. As a consequence the down time for the effected engine is greatly increased unless a stock of spare radiator cores is maintained. A further disadvantage of conventional radiator arrangements for such industrial power plants lies in the fact that in order for the engine to be placed in its preferable tandem relation directly behind the radiator and cooling fan, sufficient clearance between the two engines must be provided to accommodate the size of the radiators. Still another disadvantage of such conventional radiator arrangements is the necessary duplication of radiator and fan supports, fans, and fan-driving belts and pulleys.

Among the principal objects of this invention is to provide an improved radiator and cooling fan drive arrangement for multi-engine power plant installations overcoming the aforementioned difficulties; permitting the engines to be placed in closer side-by-side relation; providing a radiator arragement capable of repair in conventional radiator shops with a minimum of down time and capable of emergency multi-engine operation; providing a cooling fan drive arrangement whereby fan means common to both engines may be driven by either engine in the event the other engine is shut down; and eliminating the duplication of radiator and fan supports and fan driving components.

In the main, these objects are accomplished by providing a radiator structure of substantially square frontal area common to both engines and having separate cooling water systems therein for each engine, and by providing fan means between the common radiator structure and individual engines capable of being individually or collectively driven by each of the engines.

The aforementioned and other objects of the invention, as well as the combined means for accomplishing these objects, will become apparent from the following description of two embodiments of the invention in which reference is made to the attached drawings in which:

Figure 1 is a diagrammatic plan view of a twin engine industrial power plant embodying one form of my invention.

Figure 2 is a diagrammatic front elevation taken in the direction of the arrows 2—2 of Figure 1.

Figure 3 is an enlarged fragmentary detailed view in side elevation of the fan drive arrangement shown in Figure 1 with certain portions thereof broken away and in section.

Figure 4 is an enlarged fragmentary detailed view of a portion of Figure 1 with parts broken away and in section.

Figure 5:
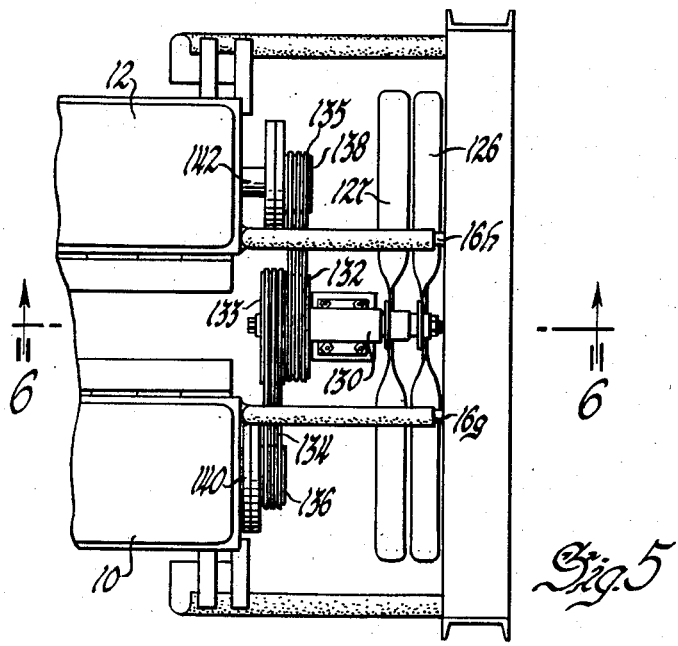
Figure 5 is a diagrammatic view similar to Figure 1 showing a modified form of my invention.

Referring more particularly to the drawings, the twin engine industrial power plant, shown in Figure 1, comprises two engines 10 and 12 mounted in parallel side-by-side relation. The outputs of the two engines are drivingly connected through torque converters 11 and 13 to a transfer case 15. A radiator structure 16 of substantially square frontal area and common to both engines is spaced axially from the front ends thereof. The radiator is made up of four separate core sections 16a, 16b, 16c, and 16d providing two separate water circuits, one for each engine. The upper and lower cores 16a and 16b on the left side of the radiator 16 are connected to each other and serve to cool the left engine, while the engine on the right side is cooled by the interconnected upper and lower cores 16c and 16d on the right side of the radiator. The upper core sections 16a and 16c on both sides of the radiator assembly are connected to separate inlet headers 16e and 16f having inlets as indicated at 16g and 16h, respectively, connected to the separate jacket cooling water outlets 18 and 19 of their engines 10 and 12 by suitable tubing or radiator hose connections 20 and 21, respectively. The lower radiator cores 16b and 16d are connected to separate outlet headers 16i and 16k having outlets 16m and 16n connected through radiator hose connections 22 and 23 to the inlets of cooling water pumps 24 and 25 mounted on the respective engines 10 and 12. The radiator components are properly supported by a frame 17 formed of channel members 17a and 17b.

Air flow through the radiator assembly is provided by an eight-bladed suction-type fan 26 located intermediate the engines and the radiator. As best seen in Figure 3, the hub 27 of the fan 26 is properly secured on the forward end of a shaft 28; a V-belt driven pulley 32 is secured to the rear end of the fan shaft 28; and the shaft 28 is journaled intermediate its ends in a vertically adjustable support bracket 30. A plurality of V-belts 34 drivingly interconnect the fan-shaft mounted pulley 32 with two V-belt driving pulleys 36 and 38 which are drivingly connected to the front ends of the engine crankshafts 40 and 42, respectively. These crankshaft ends project from the front end faces of their respective engine housings. As best shown by Figure 4, the driving connection between the V-belt pulleys 36 and 38 and the ends of the crankshafts 40 and 42, respectively, is provided by commercially available overrunning sprag-type clutches 36′. Flywheel elements 44 and 46 are also mounted on the shafts 40 and 42 inboard of the overrunning clutches and fan driving pulleys. The fan supporting bracket 30 is vertically adjustable to take up slack in and properly tension the V-belts 34.

From the foregoing description, it will be obvious that the overrunning clutches mounting the V-belt pulleys 36 and 38 on the engine crankshafts allow either engine to drive the fan 26 in the event the other engine is shut down, and when both engines are operating, the fan 26 will tend to be equally driven by both engines through the fan drive arrangement provided.

In such multiple engine installations where the output of several engines are combinable through a common transfer case, common throttle connections are provided and the engine governors are synchronized so that both engines will operate at substantially the same speed. In applications where the connection between each engine and the transfer case is provided by means of a fluid coupling, such as the torque converters 11 and 13, shown in Figure 1, this synchronization of engine speed is not too critical; slight differences in speed being accommodated by slip between the fluid coupling elements. However, where the connections between the engines and the transfer case are of a positive-engagement type speed, synchronization of engine speeds is more critical. With the overrunning clutch fan drive arrangement, shown in Figures 1 to 4, any tendency of one engine to run faster than the other will result in that particular engine picking up the fan load which will tend to drop that engine's speed off to that of the other engine. It will thus be seen that in such a multiple engine power plant, that the fan drive arrangement of this form of the invention will play an important engine governing function.

Figure 6:
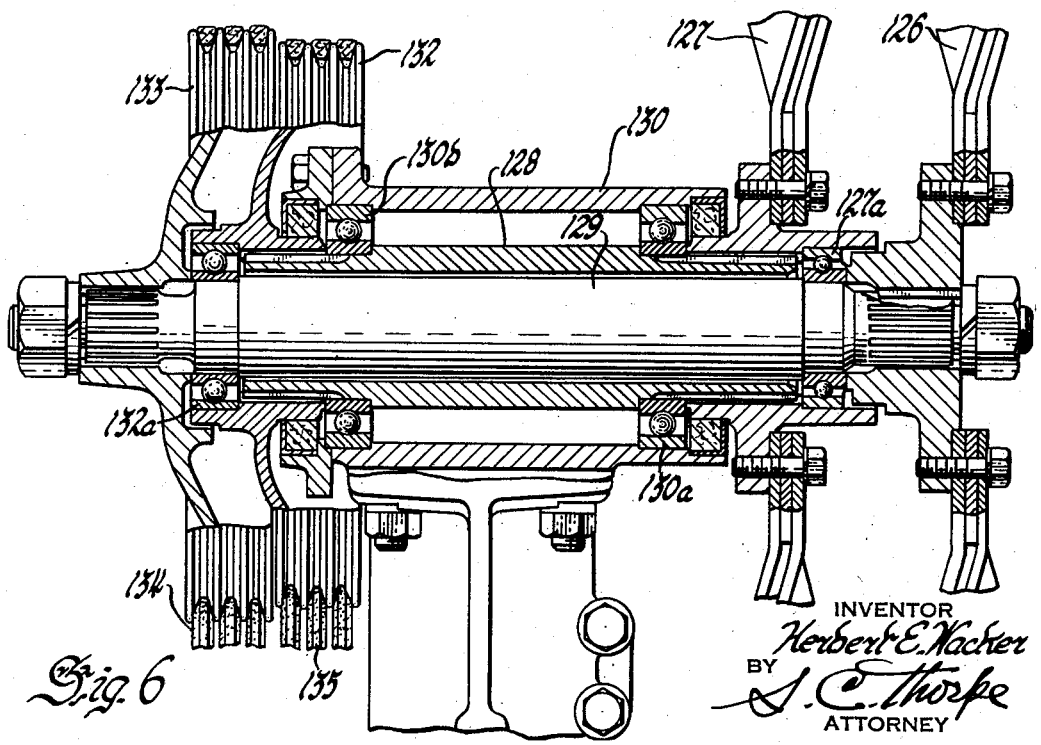
Figure 6 is a fragmentary detailed view in side elevation with portions thereof broken away and in section substantially on the line 6—6 of Figure 5.

In the modified form of cooling fan drive arrangement of the invention shown in Figures 5 and 6, two suction-type fans 126 and 127 are mounted in tandem relation on coaxial shafts. The aft fan 127 is secured to the forward end of an outer tubular shaft 128 which is rotatably journaled in a vertically adjustable fan mounting bracket 130 by anti-friction bearings, as indicated at 130a and 130b. The rear end of the shaft 128 projects rearwardly of the mounting bracket 130 and a V-belt driven pulley is suitably secured thereto. The outer tubular shaft and the hubs of the fan 127 and the pulley 132 embrace an inner shaft 129 carrying the other fan on its forward end portion. The shaft 129 is rotatably journaled in bearings 127a and 132a carried by the hubs of the fan 127 and the pulley 132, respectively. A V-belt driven pulley 133 is mounted on the rear end portion of the shaft 129 which projects rearwardly of the shaft 128 and the hub of the pulley 132. The pulleys 132 and 133 serve to drive the fans 127 and 126 and are in turn driven through two sets of V-belts 135 and 134, respectively, by V-belt pulleys 138 and 136 which are mounted on the forward end portions of the crankshafts 142 and 140 of the engines 12 and 10, respectively. The pulleys 132 and 133 are preferably of slightly different diameters to thereby vary the driving ratios of the two fans to a limited degree. This results in a constantly changing phase relationship between the two fans which prevents fan 127 from lining up behind the forward fan 126 when both engines are running thereby rendering it ineffective and adversely affecting the radiator cooling for both engines.

In the modification of Figures 5 and 6, the radiator construction is preferably the same as that utilized in the form of the invention shown in Figures 1 to 4. As best shown in Figure 2 and described above, this includes sectional coring providing separate cooling water circuits for each engine. By maintaining separate cooling systems for each engine, when one engine is down for repair or periodic overhaul, the other engine or engines of such a multiple engine power plant unit may continue to be operated. Single engine operation of a multiple engine power plant is generally under relatively light loads. Therefore, the air flow through the radiator sections connected to a particular engine as provided by the single fan driven thereby will ordinarily be sufficient to provide satisfactory cooling. However, in emergency operation with one or more engines down, the remaining engines may be required to operate at or near their full rated load. If the air flow provided by the tandem-mounted fans of the remaining operating engines is insufficient to provide proper cooling, the V-belts for the down engines can be disconnected from the fan-driving pulleys therefor, and the various pulleys can be locked together so that the blades of the various fans are radially spaced and so that all the fans are driven by the operating engines. With reference to the twin engine power plant illustrated in Figures 5 and 6, this is accomplished by securing the pulleys 132 and 133 together. A similar increased cooling effect can be achieved by interconnecting both radiator inlets 16g and 16h and the radiator outlets 16m and 16n to the water jacket outlet and cooling water pump inlet of the operating engine.

In some applications, it may be desirable for the engines such as the two engines illustrated to have a radiator inlet header common to both the jacket cooling water return inlets 16g and 16h from both engines and to the upper ends of both radiator core sections 16a and 16c, and to further provide a radiator outlet header common to both lower core sections 16b and 16d and to the outlet connections 16m and 16n to the cooling water pumps. With such a radiator arrangement, each engine may be separately operated at its full rated load since the air flow through the entire radiator core sections, and therefore the cooling effect provided thereby, is proportional to the number and speed of the engines operating at a given time.

In view of the above description of two embodiments of the invention, it will be seen that the several objects of the invention are achieved and other advantageous results are attained. As many changes could be made in the above construction without departing from the scope of the invention, it is intended that all matter contained in the above description or shown in the accompanying drawings shall be interpreted as illustrative and not in a limiting sense. It is appreciated that various minor modifications may be made without departing from the spirit and scope of the invention as defined in the following claims.

I claim:

1. In a power plant, a pair of engines mounted in side-by-side relation and adapted for independent or joint operation, each of said engines having a liquid cooling system, a single radiator assembly of substantially square frontal area and comprising a plurality of similar core sections, said assembly being common to and spaced longitudinally from said engines, said radiator assembly being connected to the liquid-cooling system of each of said engines and adapted to provide a separate circuit for the flow of liquid coolant therethrough for each of said engines, fan means intermediate said engines and said radiator assembly for circulating cooling air through said radiator assembly, and means for providing independent operation of said fan means by each of said engines when the other of said engines is not in operation and for joint operation of said fan means when both of said engines are in operation.

2. In the combination set forth in claim 1, said radiator assembly comprising four identical core sections interconnected to provide said separate coolant circuits and mounted to provide said assembly with its substantially square frontal area.

3. In a power plant, the combination comprising a pair of engines mounted in side-by-side relation and adapted for alternative or simultaneous operation, said engines having independent liquid cooling systems and output shafts rotatable in the same direction, a radiator assembly of substantially square frontal area mounted in longitudinally spaced relation to said engines and comprising a plurality of identical core sections interconnected to provide separate circuits for the flow of liquid coolant therethrough from the cooling systems of each of said engines, fan means for circulating cooling air through said radiator assembly, and drive means intermediate said fan means and said engine shafts and operable to provide independent operation of said fan means by one of said engines when the other of said engines is not in operation and operable to provide for joint operation of said fan means when both of said engines are in operation.

4. In a power plant, the combination comprising a pair of engines mounted in side-by-side relation and adapted to be driven independently or jointly with the outputs thereof being combinable through a transfer mechanism common thereto, said engines having independent liquid cooling systems and output shafts rotatable in the same direction, a radiator assembly mounted in longitudinally spaced relation to said engines and comprising a plurality of core sections interconnected to provide separate circuits for the flow of liquid coolant therethrough from the cooling systems of each of said engines, fan means for circulating cooling air through said radiator assembly and including a first fan and a second fan rotatably mounted about a common axis in tandem relation to each other, a first means for establishing a driving connection of a given ratio intermediate said first fan and one of said engine shafts, and a second means for establishing a driving connection intermediate said second fan and the other of said engine shafts, said last-mentioned driving connection being of a ratio differing slightly from said given ratio whereby said fans are caused to rotate with a constantly changing phase relationship therebetween thereby preventing said fans from operating in alignment when both said engines are operating.

5. In a power plant, the combination comprising a pair of engines mounted in side-by-side relation and adapted to be driven independently or simultaneously, said engines each having output shafts rotatable in the same direction and having independent liquid cooling systems, transfer means operable to drivingly interconnect said output shafts to a common load, a radiator assembly mounted in longitudinally spaced relation to said engines, said radiator being connected to and adapted to provide separate circuits for the flow of liquid coolant therethrough from the cooling systems of each of said engines, fan means for circulating cooling air through said radiator assembly including two fans rotatably mounted about a common axis in axially spaced tandem relation to each other, and means for establishing independent driving connections of slightly different ratio intermediate each of said fans and a different one of said engine shafts whereby each of said engines will independently drive the fan connected thereto and provide a constantly changing phase relationship between said fans when both of said engines are in operation.

6. In a power plant, the combination comprising a pair of engines mounted in side-by-side relation and adapted for independent or simultaneous joint operation, said engines having independent liquid cooling systems and output shafts rotatable in the same direction, transfer means operable to drivingly interconnect said output shafts to a common load, a radiator assembly of substantially square frontal area mounted in longitudinally spaced relation to said engines and comprising a plurality of identical core sections interconnected to provide separate circuits for the flow of liquid coolant therethrough from the cooling systems of each of said engines, fan means for circulating cooling air through said radiator assembly, and drive means intermediate said fan means and said engine shafts and including overrunning clutches operable to provide independent operation of said fan means by one of said engines when the other of said engines is not in operation and operable to provide for joint operation of said fan means when both of said engines are in operation.

References Cited in the file of this patent

UNITED STATES PATENTS

| | | |
|---|---|---|
| 968,127 | Cloud | Aug. 23, 1910 |
| 1,466,394 | Fornaca | Aug. 28, 1923 |
| 1,500,668 | Church | July 8, 1924 |
| 1,782,394 | Beimling | Nov. 25, 1930 |
| 2,264,820 | Young | Dec. 2, 1941 |